United States Patent [19]

Juy

[11] Patent Number: 4,954,121
[45] Date of Patent: Sep. 4, 1990

[54] REAR DERAILLEUR FOR BICYCLES OR SIMILAR VEHICLES

[75] Inventor: Henri Juy, Dijon, France

[73] Assignee: Simplex, S.A., France

[21] Appl. No.: 378,322

[22] Filed: Jul. 11, 1989

[30] Foreign Application Priority Data

Jul. 12, 1988 [FR] France .................... 88 09758

[51] Int. Cl.$^5$ ............................................. F16H 11/00
[52] U.S. Cl. ........................................................ 474/82
[58] Field of Search ......................................... 474/78–82

[56] References Cited

U.S. PATENT DOCUMENTS 4,030,375 6/1977 Nalano .................................. 474/82
4,161,124 7/1978 Juy ......................................... 474/82

FOREIGN PATENT DOCUMENTS 0625167 3/1963 Belgium ................................ 474/82

Primary Examiner—Thuy M. Bui
Attorney, Agent, or Firm—Eric P. Schellin

[57] ABSTRACT

A rear derailleur for a bicycle. The conventional fixed part to which one end of the usual operating cable is attached in selectively movable to change the angle which the cable makes so as the increase or reduce the extent of transverse movement of the linkage for the same extent of angular movement of the lever.

6 Claims, 1 Drawing Sheet

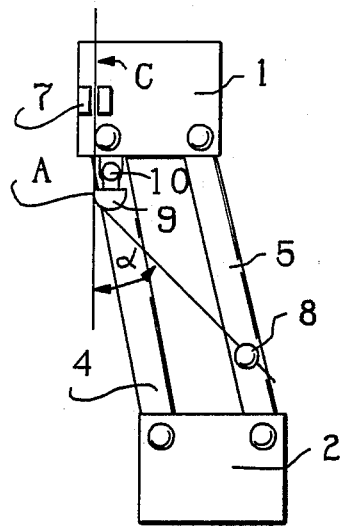
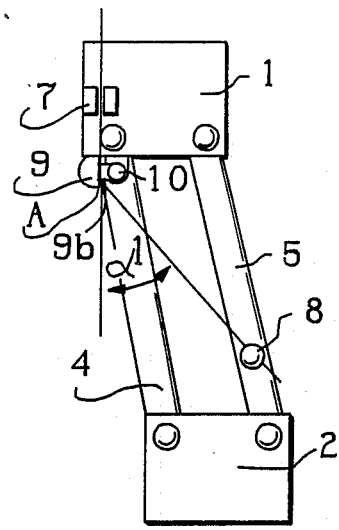
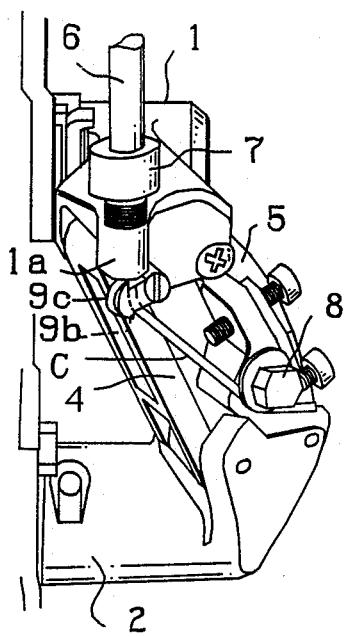
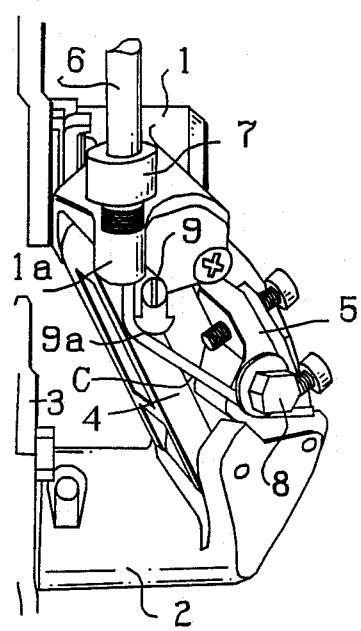

4,954,121

REAR DERAILLEUR FOR BICYCLES OR SIMILAR VEHICLES

BACKGROUND OF THE INVENTION

The invention relates to the engineering sector of cycle accessories.

In particular, but not limited to this, the invention relates to rear derailleurs linked to indexed levers or handles. It is known that the indexing corresponds to one pitch so that one travel of the lever in function of the winding drum on that lever corresponds to a particular moved length of cable. Under these conditions, as the length of cable pulled is always the same, it would appear that the transverse movement of the chain guide is always the same. This consequence raises certain problems.

In fact, it is not possible to use the same derailleur if it is wished, for example, to change free-wheel, going from a 6-speed free-wheel to a compact 7 or 8-speed free-wheel.

The problem is, therefore, for the same angular movement of the lever, i.e. for the same pulled cable length, to be able to achieve a different derailleur travel.

In particular, the derailleur is of the type which comprises, in an already known way, an upper bracket fixed to the bicycle and a lower bracket which carries a chain guide, these brackets being connected by a linkage system forming a deformable parallelogram linked to an operating cable integral with a lever, this cable working in conjunction with a fixed part of the derailleur, in particular the top bracket and a fixing point on a moving part.

In order to solve the problem, in accordance with the invention, at the fixed part which takes the cable, the derailleur has means for moving the support and cable return point at will in order to change the angle ($\alpha$) which the cable makes, in such a way as to increase or reduce the extent of transverse movement of the parallelogram for the same extent of angular movement of the lever.

SUMMARY OF THE INVENTION

The problem raised can advantageously be solved through the following features:

The means of moving the supporting and return point at will is a unit fitted so that is is capable of angular movement in order essentially to take up two positions.

The unit is arranged, in relation to the angular position which it takes up, so as to allow for two different routings of the cable corresponding to movement of the supporting point in the same axial alignment as the fixed part of the derailleur which takes the cable.

The unit has a through hole into which the cable can be inserted and, at its free end, a supporting and guiding face which can work in conjunction with the cable as required.

BRIEF DESCRIPTION OF THE DRAWINGS

The invention is explained in greater detail below, using the drawings in which:

FIG. 1 is a purely diagrammatic front view showing the derailleur in a traction cable position corresponding to a particular extent of cross movement.

FIG. 2 is a similar view corresponding to FIG. 1 showing another position.

FIGS. 3 and 4 are perspective views of one example of the derailleur, in two different positions, each corresponding to the extents of movement.

DETAILED DESCRIPTION OF THE DRAWINGS

In a way which is already fully known, the derailleur has a top bracket (1) fixed to the bicycle and a bottom bracket (2) which takes a chain guide (3). The brackets (1) and (2) are connected by a linkage system (4–5) which forms a deformable parallelogram linked to a traction cable (C) integral with a lever or handle.

The cable (C) is inserted in a sheath (6) abutting with a centered sheath stop (7) and supported in a guide (1A) on the top bracket (1). The free end of the cable (C) works in conjunction with a cable fastener (8) connected to the front link (5) or to the bottom bracket (2). The outlet from the guide (1a) and the cable fastener (8) are located practically along one of the diagonals of the parallelogram.

Under these conditions, a traction force exerted on the cable (C) by means of the lever has the effect of moving transversely the bottom bracket (2) linked to the chain guide (3) in the direction of the larger diameter sprockets.

In accordance with the invention, a fixed part of the derailleur, in particular the upper bracket, has means for moving at will the supporting and return point (A) of the cable (C) located on the diagonal defined by the route of that cable. The effect of moving the supporting point (A) is to change the angle ($\alpha$) which the cable (C) makes which results in increasing or reducing the extent of transverse movement of the parallelogram for the same extent of angular movement of the lever (FIGS. 1 and 2).

The means for moving the point (A) take the form of a unit (9) fitted so that it can move angularly to take up essentially two positions at the outlet of the guide tunnel. In particular, the unit (9) is arranged, in relation to the angular position it takes up, to allow for two different routes of the cable corresponding to two different angles ($\alpha$) and ($\alpha$1) considered from the cable direction given by the outlet tunnel (1a).

The unit (9) is hinged by a bolt (10) and a section of it (9a) is offset to the side in relation to that bolt. This part (9a) has, on the one hand, a through hole (9b) and, on the other, at its free end, a supporting and guiding face (9c).

Under these conditions, when the unit (9) is directed at an angle, for instance in a more or less horizontal plane, the cable (C) can be inserted in the through hole. In this position of the supporting point (A), the traction force operates at an angle ($\alpha$) corresponding to a particular transverse movement of the derailleur (FIG. 4).

On the other hand, when the unit (9) is directed at an angle, for instance in a more or less vertical plane, the cable (C) can work in conjunction with the supporting and guiding face (9c). This position of the supporting point (A) for the traction force at an angle ($\alpha$1) corresponding to a different extent of movement of the derailleur (FIG. 3).

It seems that the higher the point (A) is located on the diagonal, the greater is the extent of transverse movement.

An important result of these arrangements is that the supporting point (A) for the traction force, whatever the position of the unit (9) selected, is aligned with the fixed part (1a) of the derailleur which takes the cable, and in the extension of it.

The through hole (9b) of the unit (9) can be straight or curved. The supporting face (9c) is curved.

The arrangements described do, or course, apply to all types of rear derailleurs linked to an operating lever or handle with or without an indexing system.

The advantages clearly emerge from the description; in particular, it is stressed and a reminder is given that for the same angular movement of the handle, i.e. for the same pulled length of cable, a different extent of transverse movement is achieved depending on the selected position of the return unit. It is thus possible, with the same derailleur, to change from a six-speed free-wheel to a seven or eight-speed free-wheel.

I claim:

1. A rear derailleur for bicycles and similar vehicles, of the type which comprises a top bracket (1) fixed to the bicycle and a bottom bracket (2) carrying a chain guide (3), these brackets (1) and (2) being connected by a linkage system (4-5) making a deformable parallelogram linked to an operating cable (C) integral with a lever, this cable working in conjunction with a fixed part (1a) of the derailleur, in particular the top bracket and a fixing point (8) on a moving part, wherein it has, at the fixed part which takes the cable, a facility (9) for moving at will the supporting and return point (A) of the cable to change the angle ($\alpha$) which the cable makes so as to increase or reduce the extent of transverse movement of the parallelogram for the same extent of angular movement of the lever.

2. A derailleur in accordance with claim 1 wherein the means for moving at will the supporting and return point is a unit (9) fitted so that it can move angularly to take up essentially two positions, to be selected to suit the free-wheel used.

3. A derailleur in accordance with claim 2 wherein the unit (9) is arranged, in relation to the angular position which it takes up, so as to allow for different routes of the cable, corresponding to movement of the supporting point, in the same axial alignment as the fixed part of the derailleur which takes the cable.

4. A derailleur in accordance with claim 3 wherein the unit has a through hole (9b) into which the cable can be inserted and, at its free end, a supporting and guiding face (9c) capable of working in conjunction with that cable as required.

5. A derailleur in accordance with claim 4 wherein the supporting and guiding face is curved.

6. A derailleur in accordance with claim 4 wherein the through hole is curved.

* * * * *